(12) United States Patent
Yamamoto (10) Patent No.: US 11,159,049 B2
(45) Date of Patent: Oct. 26, 2021

(54) POWER SUPPLY SYSTEM (71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Satoshi Yamamoto, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/757,062

(22) PCT Filed: Jun. 28, 2018

(86) PCT No.: PCT/JP2018/024500
§ 371 (c)(1),
(2) Date: Apr. 17, 2020

(87) PCT Pub. No.: WO2019/082443
PCT Pub. Date: May 2, 2019

(65) Prior Publication Data
US 2020/0251930 A1 Aug. 6, 2020

(30) Foreign Application Priority Data
Oct. 26, 2017 (JP) .............................. JP2017-206902

(51) Int. Cl.
*H02J 50/10* (2016.01)
*H02J 50/80* (2016.01)
(Continued)

(52) U.S. Cl.
CPC ................ *H02J 50/10* (2016.02); *B60N 2/06* (2013.01); *B60N 2/90* (2018.02); *B60R 16/02* (2013.01);
(Continued)

(58) Field of Classification Search
CPC .. H02J 50/10; H02J 50/80; H02J 50/90; H02J 50/40; B60N 2/90; B60N 2/06;
(Continued)

(56) References Cited

U.S. PATENT DOCUMENTS 9,124,308 B2 * 9/2015 Metcalf ..................... A47C 7/72
9,730,518 B1 * 8/2017 Jacobs ................... A47C 7/746
(Continued)

FOREIGN PATENT DOCUMENTS

JP 2006-081249 A 3/2006
JP 2009-292230 A 12/2009
(Continued)

OTHER PUBLICATIONS

International Search Report dated Sep. 4, 2018 for WO 2019/082443 A1 (4 pages).

*Primary Examiner* — Pinping Sun
(74) *Attorney, Agent, or Firm* — Abelman, Frayne & Schwab (57) ABSTRACT

A power supply system 10 is for a seat 40 that is slidable with respect to rails 12 provided on a floor portion 11 of a vehicle body, the power supply system 10 including: power transmission coils 20A to 20H provided on the floor portion 11; a power reception coil 30 that is fixed to the seat 40 and that can receive power from the power transmission coils 20A to 20H at normal positions facing the power transmission coils 20A to 20H; and moving means 33 for moving the power reception coil 30 to a normal position when the power reception coil 30 is not at the normal position.

9 Claims, 10 Drawing Sheets

(51) Int. Cl.
*H02J 50/90* (2016.01)
*H02J 50/40* (2016.01)
*B60N 2/90* (2018.01)
*B60N 2/06* (2006.01)
*B60R 16/02* (2006.01)
*H01F 38/14* (2006.01)

(52) U.S. Cl.
CPC .............. *H01F 38/14* (2013.01); *H02J 50/40* (2016.02); *H02J 50/80* (2016.02); *H02J 50/90* (2016.02)

(58) Field of Classification Search
CPC ............ B60N 2/067; B60N 2002/0264; B60N 2002/0272; B60R 16/02; H01F 38/14
See application file for complete search history.

(56) References Cited

U.S. PATENT DOCUMENTS

| | | | |
|---|---|---|---|
| 2010/0213894 A1* | 8/2010 | Sip | B60L 53/38 320/108 |
| 2011/0228429 A1* | 9/2011 | Ueta | B60N 2/0232 361/31 |
| 2011/0291615 A1* | 12/2011 | Pandya | B60L 53/12 320/108 |
| 2013/0015705 A1 | 1/2013 | Abe | |
| 2014/0015336 A1* | 1/2014 | Weber | H02J 7/0047 307/104 |
| 2014/0225454 A1 | 8/2014 | Ichikawa | |
| 2015/0214751 A1 | 7/2015 | Niizuma | |
| 2017/0136907 A1* | 5/2017 | Ricci | H02J 5/005 |
| 2018/0226843 A1* | 8/2018 | Ha | H02J 5/005 |
| 2018/0287434 A1* | 10/2018 | Ii | B60L 53/122 |
| 2019/0260238 A1* | 8/2019 | Cho | B60N 2/5685 |

FOREIGN PATENT DOCUMENTS

| | | | |
|---|---|---|---|
| JP | 2012-080636 A | | 4/2012 |
| JP | 2015-081014 A | | 4/2015 |
| JP | 2015-134513 A | | 7/2015 |
| JP | 2015134513 A | * | 7/2015 |
| JP | 2016-107756 A | | 6/2016 |
| JP | 2016-220268 A | | 12/2016 |

* cited by examiner

POWER SUPPLY SYSTEM

CROSS REFERENCE TO RELATED APPLICATIONS

This application is a national phase of PCT application No. PCT/JP2018/024500, filed on 28 Jun. 2018, which claims priority from Japanese patent application No. 2017-206902, filed on 26 Oct. 2017, all of which are incorporated herein by reference.

TECHNICAL FIELD

The present specification discloses a technique for supplying power to a slidable seat.

BACKGROUND

Conventionally, a technique for supplying power to a slidable seat of an automobile in a contactless manner is known. The power supply mechanism of a sliding seat disclosed in Patent Document 1 includes a power reception unit in which a plurality of power reception coils are provided, and a power supply unit including, on the floor portion of the vehicle body, one power supply coil that supplies power to the power reception coils in a contactless manner, and the power reception coils are respectively provided at a plurality of locations in the sliding seat and are supplied with power from the power supply coil in a contactless manner.

PRIOR ART DOCUMENT

Patent Document
Patent Document 1: JP 2015-134513A

SUMMARY OF THE INVENTION

Problems to be Solved

When the sliding seat slides, the positions of the power reception coils provided on the sliding seat move with respect to the power supply coil. If the positions of the power reception coils move with respect to the power supply coil, the power supply efficiency may deteriorate unless a power reception coil is disposed at a position suitable for power supply.

The technique disclosed in the present specification has been completed based on the above circumstances, and an object thereof is to provide a power supply system capable of suppressing deterioration in power supply efficiency.

Means to Solve the Problem

The power supply system disclosed in the present specification is a power supply system for a seat that is slidable with respect to a rail provided on a floor portion of a vehicle body, the power supply system including: a power transmission unit provided on the floor portion; a power reception unit that is fixed to the seat and that can receive power from the power transmission unit at a normal position facing the power transmission unit; and moving means for moving the power reception unit to the normal position when the power reception unit is not at the normal position.

According to this configuration, when the power reception unit is not at the normal position, the power reception unit can receive power from the power transmission unit after being moved to the normal position by the moving means. Accordingly, deterioration of power supply efficiency can be suppressed.

The following embodiments are preferable as the embodiments of the technique disclosed in the present specification.

The seat may include a power storage unit configured to store power received by the power reception unit, and the moving means may move the power reception unit to the normal position with the power supplied from the power storage unit.

In this manner, if power supply from the power transmission unit to the power reception unit is interrupted when the seat is slid, the power reception unit can be moved to the normal position with the power supplied from the power storage unit.

The power supply system may further include a power supply switch configured to turn on/off power supply from the power storage unit to the moving means, and control means for turning the power supply switch on/off.

The power supply system may further include operation means for allowing a user to perform an operation concerning movement of the seat, and the control means may turn the power supply switch on/off in accordance with an operation of the operation means.

The moving means is a power reception moving unit configured to move the power reception unit with respect to the seat.

With this configuration, the power reception moving unit moves the power reception unit with respect to the seat, so that the power reception unit can receive power from the power transmission unit at the normal position without further moving the seat that has been slid to a desired position by the user.

The power supply system may further include a position detection unit that can detect the position of the power reception unit, and the moving means may move the power reception unit to the normal position based on a detection result provided from the position detection unit.

The power supply system may further include operation means for allowing a user to stop the movement of the seat, and control means for controlling the power reception moving unit to move the power reception unit with respect to the seat when an operation for stopping the movement of the seat is performed by the operation means.

With this configuration, the power reception unit moves when the movement of the seat is stopped. Accordingly, it is possible to easily align the power reception unit with the normal position as compared with a configuration in which the power reception unit is moved when the seat is moved, for example.

The moving means is provided on the seat.

With this configuration, the available space on the vehicle body side can be increased compared to a configuration in which the moving means is provided at the vehicle body side.

The power supply system may include a plurality of the power transmission units, and, on the floor portion, the plurality of power transmission units may be disposed side by side along a slide direction of the seat.

With this configuration, the plurality of power transmission units that supply power to the power reception unit can be switched according to the sliding movement of the seat.

Effect of the Invention

According to the technique disclosed in the present specification, it is possible to suppress deterioration in power supply efficiency of a power supply system.

DETAILED DESCRIPTION TO EXECUTE THE INVENTION

First Embodiment

A first embodiment will be described with reference to FIGS. 1 to 10.

A power supply system 10 of the present embodiment is, for example, installed in a vehicle such as an automobile, and supplies power to electrical components 39A and 39B that are installed in a seat 40. In the following description, it is assumed that the X direction in FIG. 1 is frontward, the Y direction is leftward, and the Z direction is upward.

Figure 1:
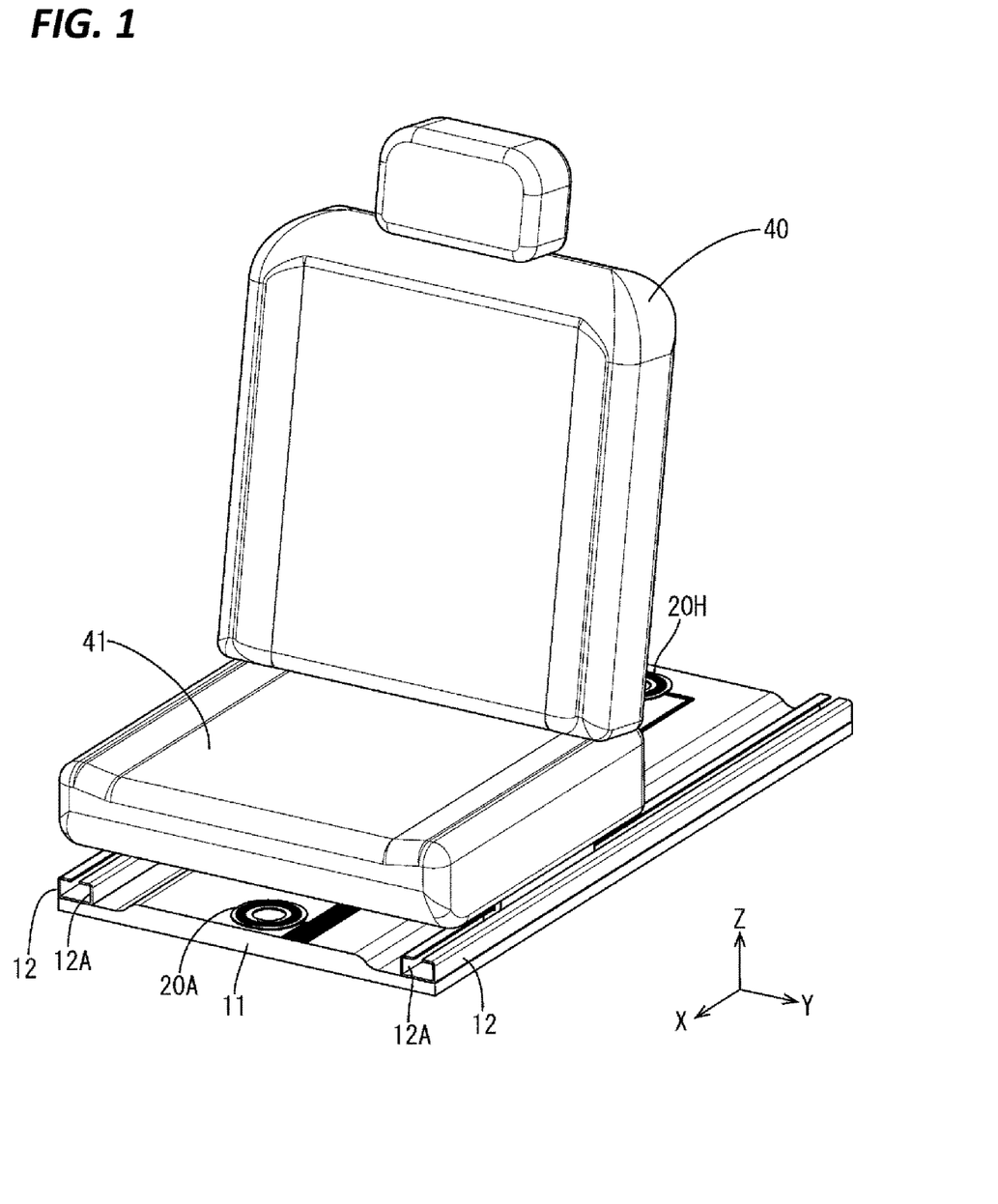
FIG. 1 is a perspective view showing a seat including a power supply system of a first embodiment.
Figure 2:
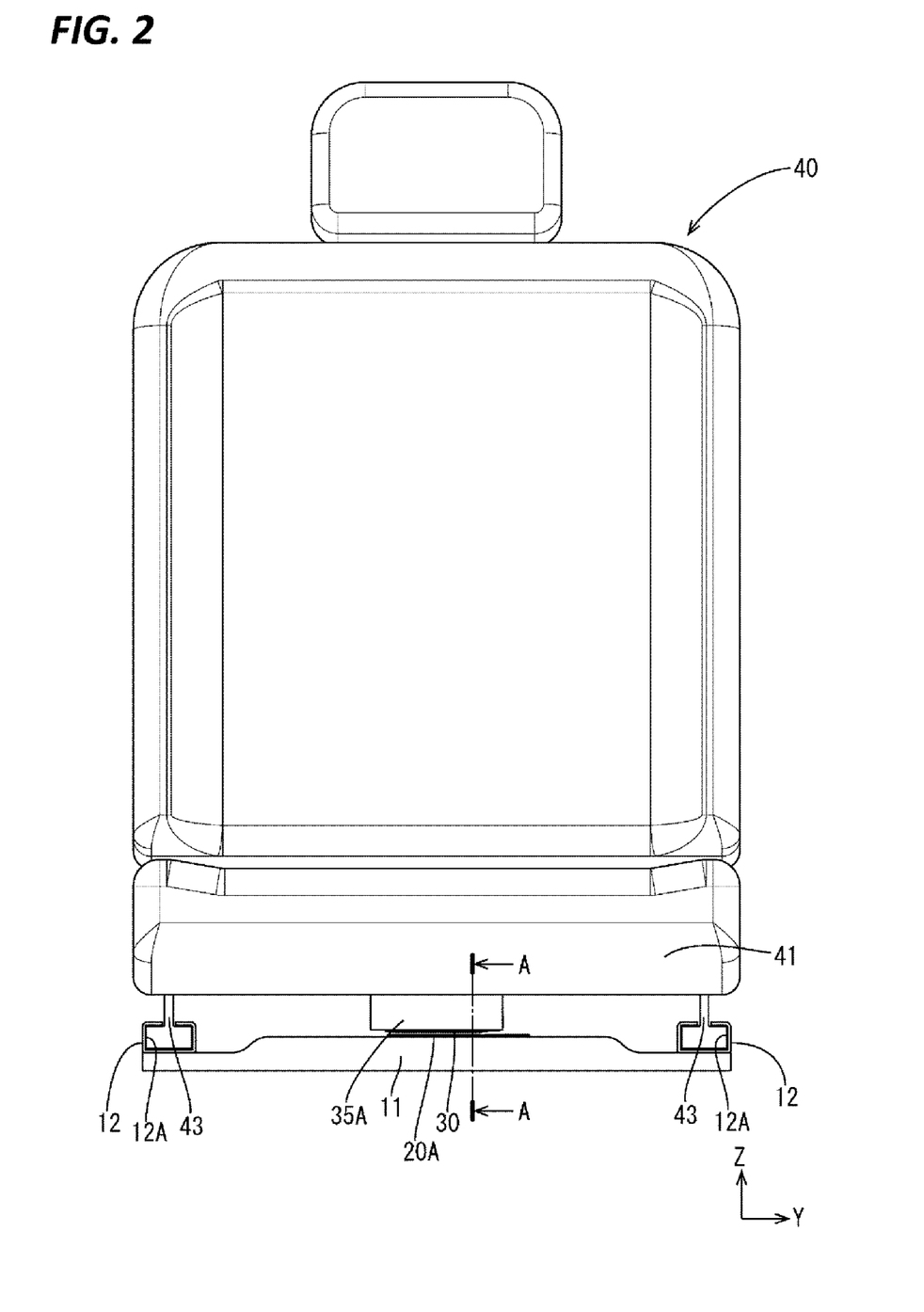
FIG. 2 is an elevation view showing the seat including the power supply system.
Figure 4:
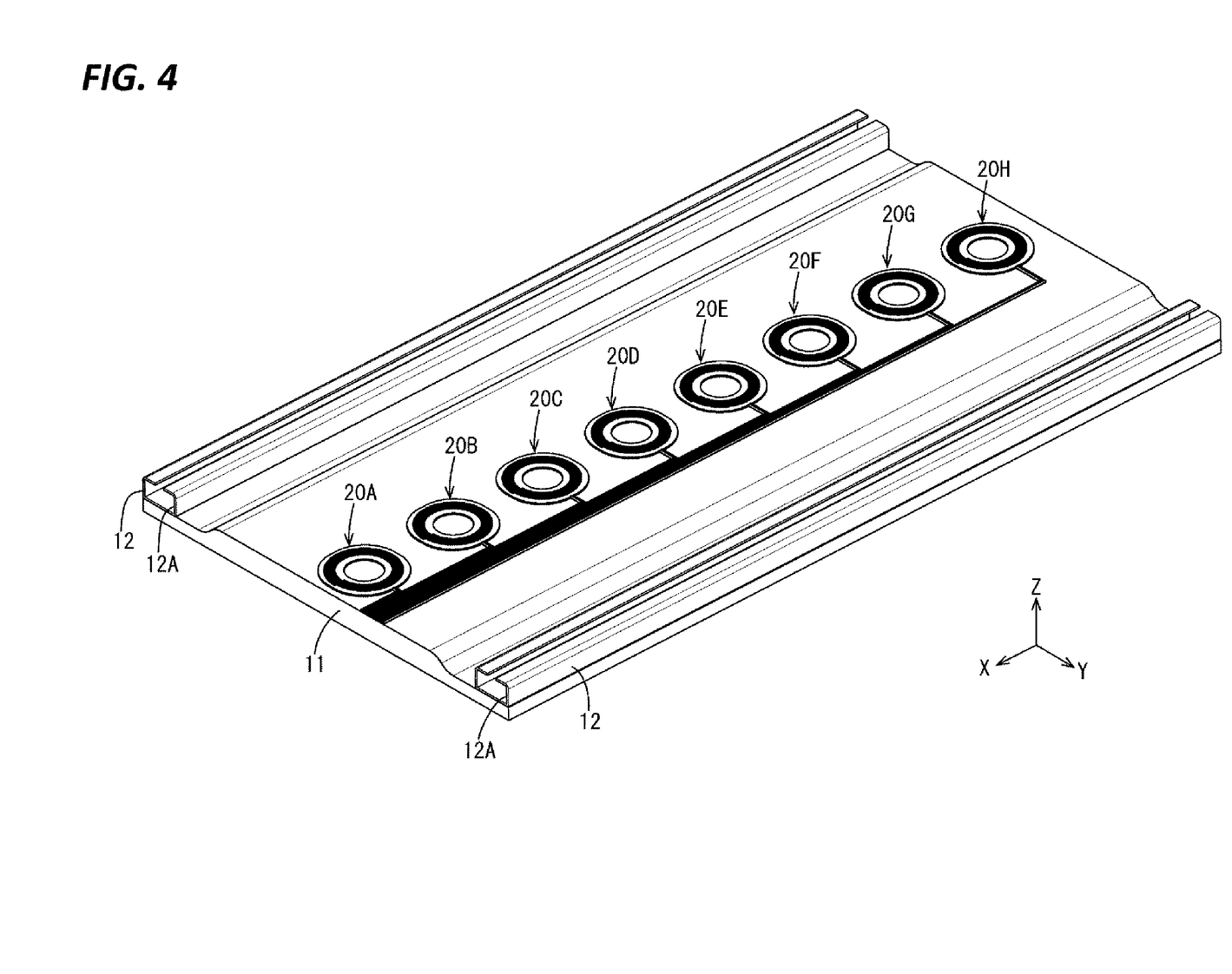
FIG. 4 is a perspective view showing a state in which rails and power transmission coils are attached to a floor portion of a vehicle body.

As shown in FIGS. 1 and 4, in a vehicle, a pair of rails 12 are fixed on a floor portion 11 of the passenger compartment of a vehicle body (a part of the floor portion of the vehicle body is shown in FIG. 1), and the seat 40 can slide in the front-rear direction with respect to the pair of rails 12. A plurality of seats 40 are provided in the vehicle, and each seat 40 includes a seat portion 41 on which a passenger sits. As shown in FIG. 2, leg portions 43 made of metal that support the seat 40 are provided below the seat portion 41. Each leg portion 43 has an upper portion that is fixed to the seat portion 41 and a lower diameter-expanded portion that is inserted into the rail 12 to be slidable. Some or all of the plurality of seats 40 are provided with various electrical components such as an electric reclining device, a seat heater, a display such as a touch panel, an air conditioner, a sensor that detects whether a passenger is seated, and a sensor that detects whether a seat belt is worn (the electrical components 39A and 39B are shown in FIGS. 6 to 9, and other electrical components are omitted). Power is supplied to the various electrical components 39A and 39B from the power supply system 10 that is described later. Each of the rails 12 is made of metal such as steel or aluminum, for example, has a rectangular tube shape and extends linearly, and a through hole 12A is formed over the entire length in its front-rear direction.

Figure 3:
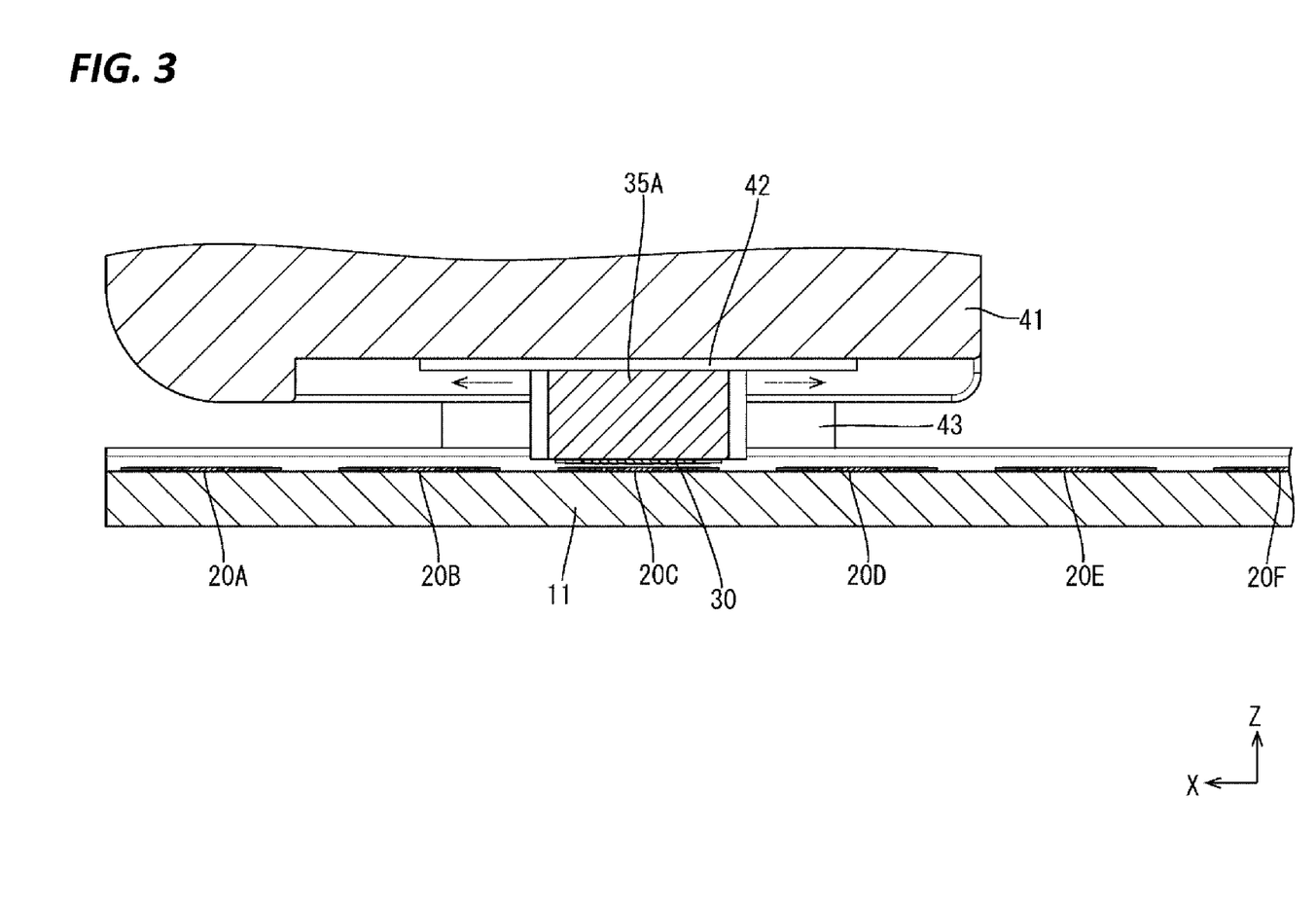
FIG. 3 is a cross-sectional view taken along line A-A of FIG. 2.
Figure 5:
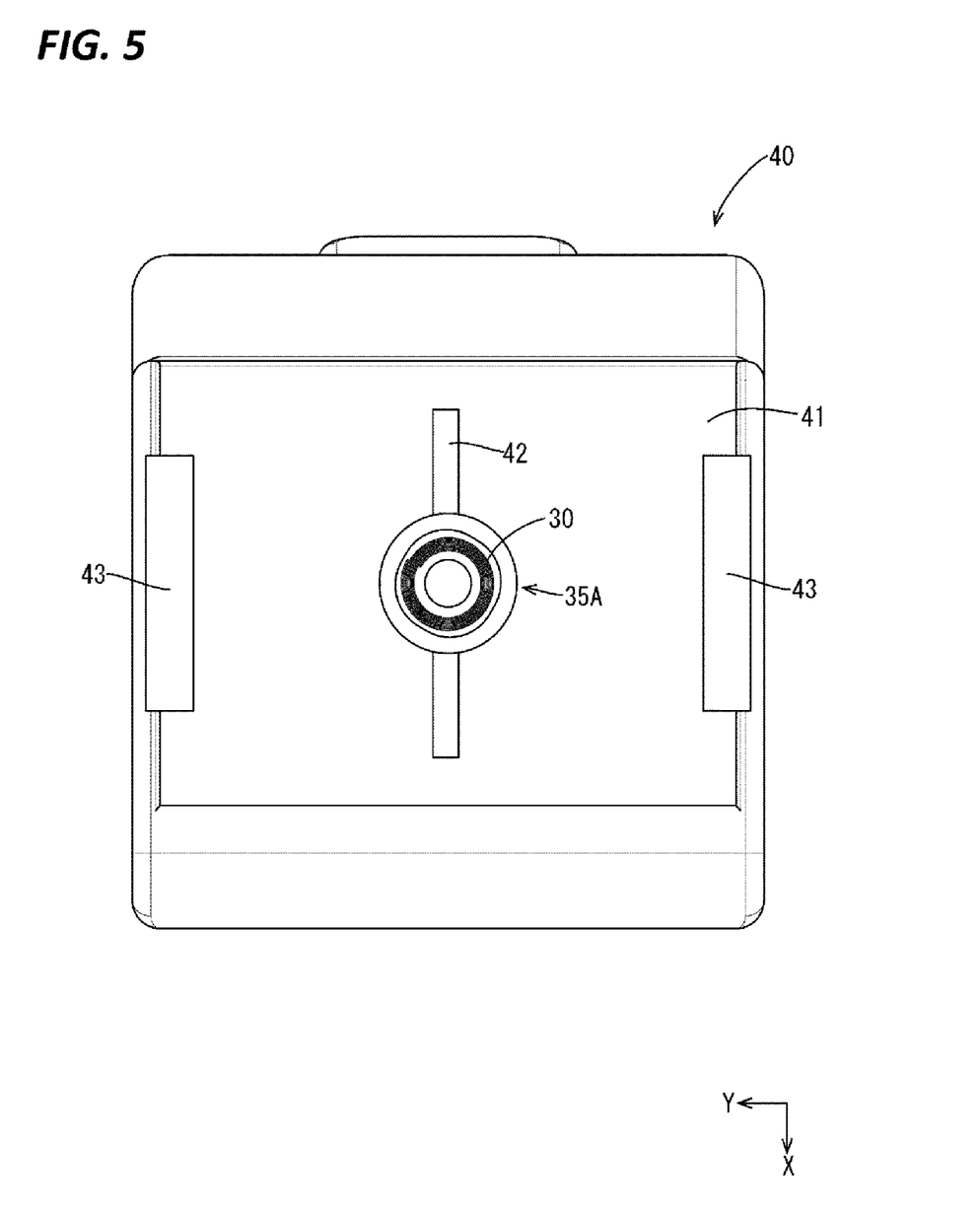
FIG. 5 is a bottom plan view of the seat.

As shown in FIGS. 3 and 5, on the lower surface of the seat portion 41, a coil moving unit 35A (an example of a "power reception moving unit") that can slide with respect to the seat portion 41 of the seat 40, and a power reception coil 30 (an example of a "power reception unit") that is fixed to the lower surface of the coil moving unit 35A are provided. A shaft portion 42 extending in the front-rear direction is fixed to the lower surface of the seat 40, for example. The coil moving unit 35A includes, for example, a motor, and is movable in the front-rear direction (in the directions indicated by arrows in FIG. 3) along the shaft portion 42 by driving the motor. The power reception coil 30 is fixed to the lower surface of the coil moving unit 35A using any of various fixing means such as screwing or an adhesive, for example.

Figure 6:
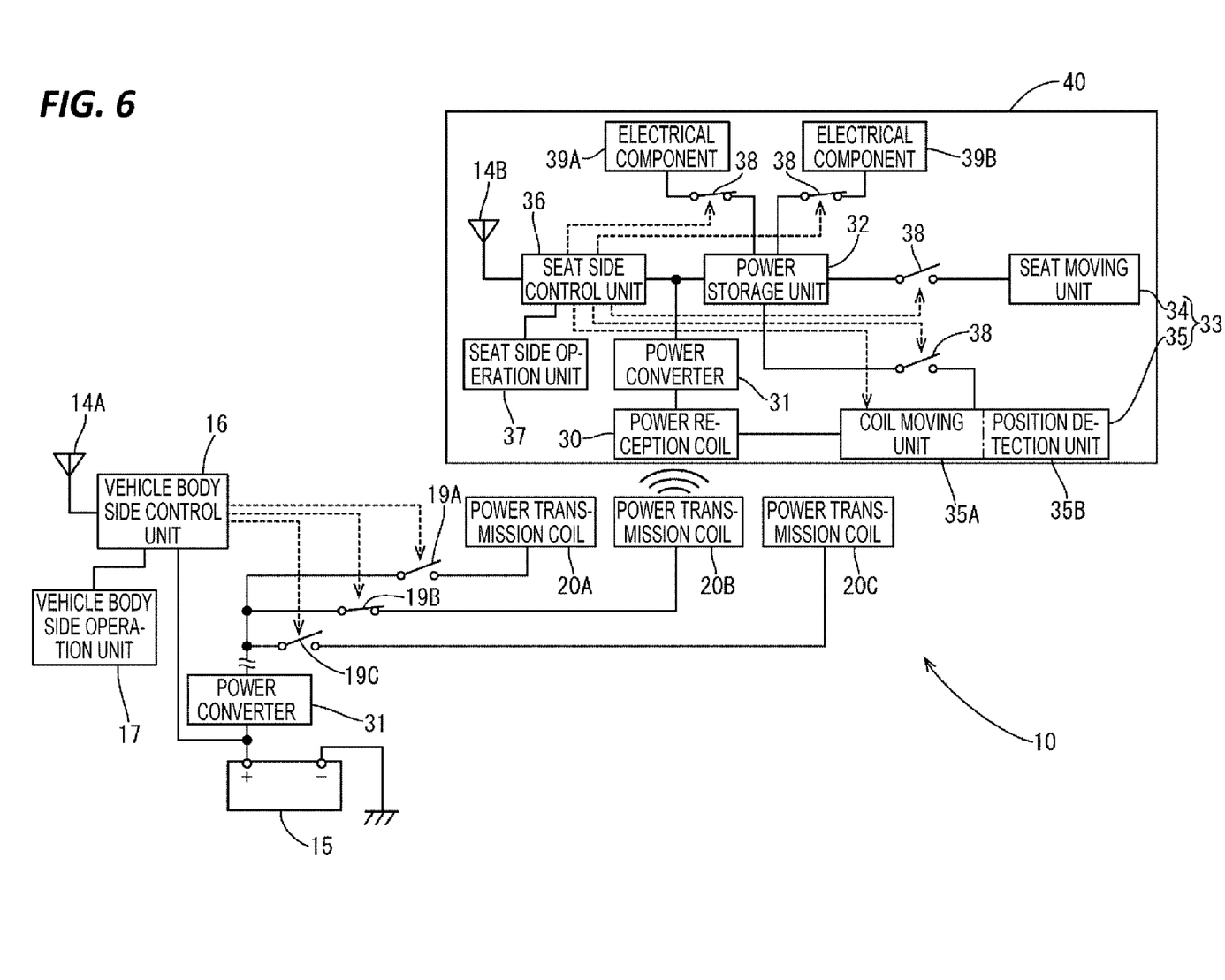
FIG. 6 is a diagram showing an electrical configuration of a vehicle including the power supply system in which the power reception coil is disposed at a normal position.
Figure 7:
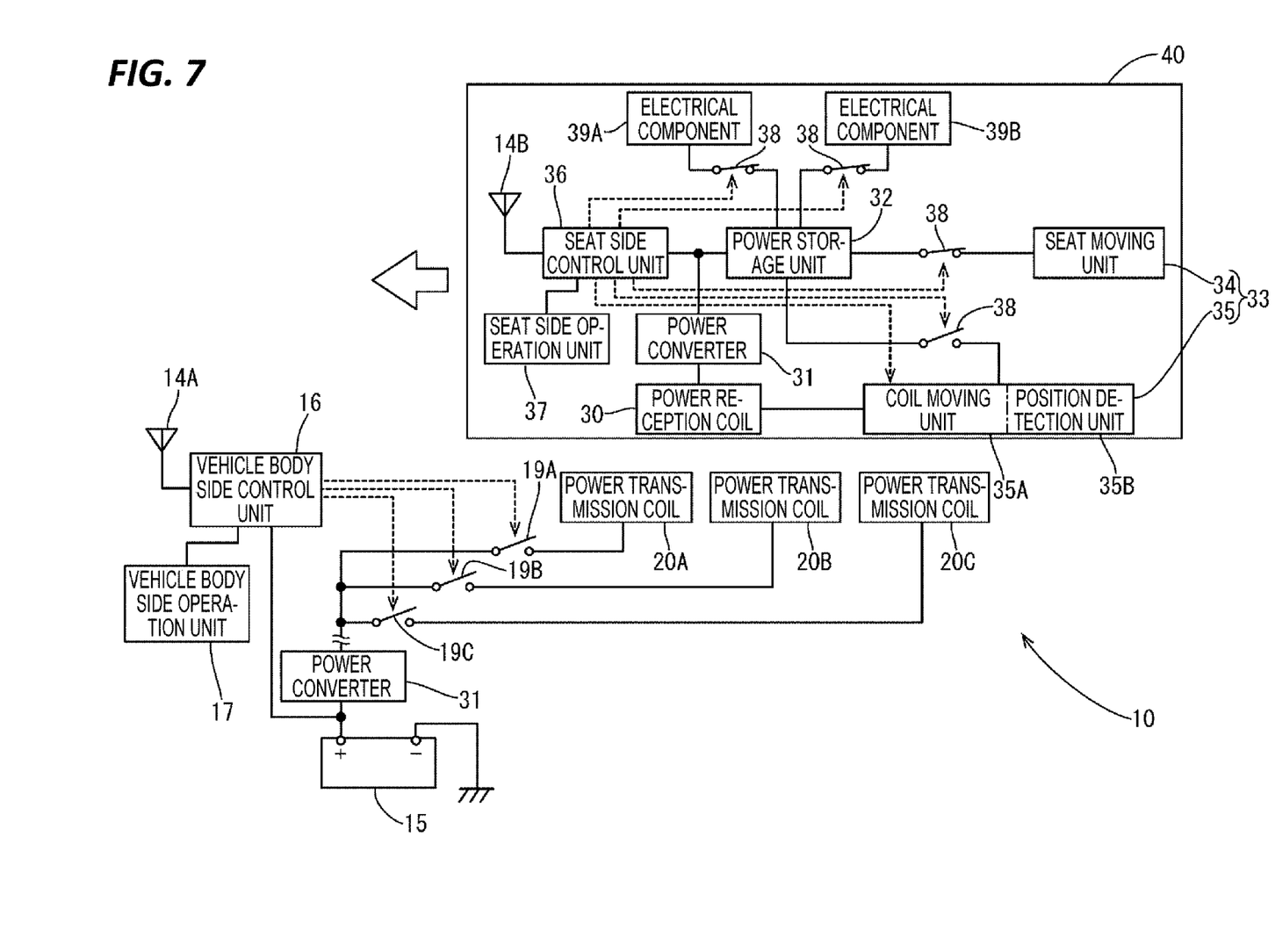
FIG. 7 is a diagram showing a state in which the seat slides forward from the state of FIG. 6.
Figure 8:
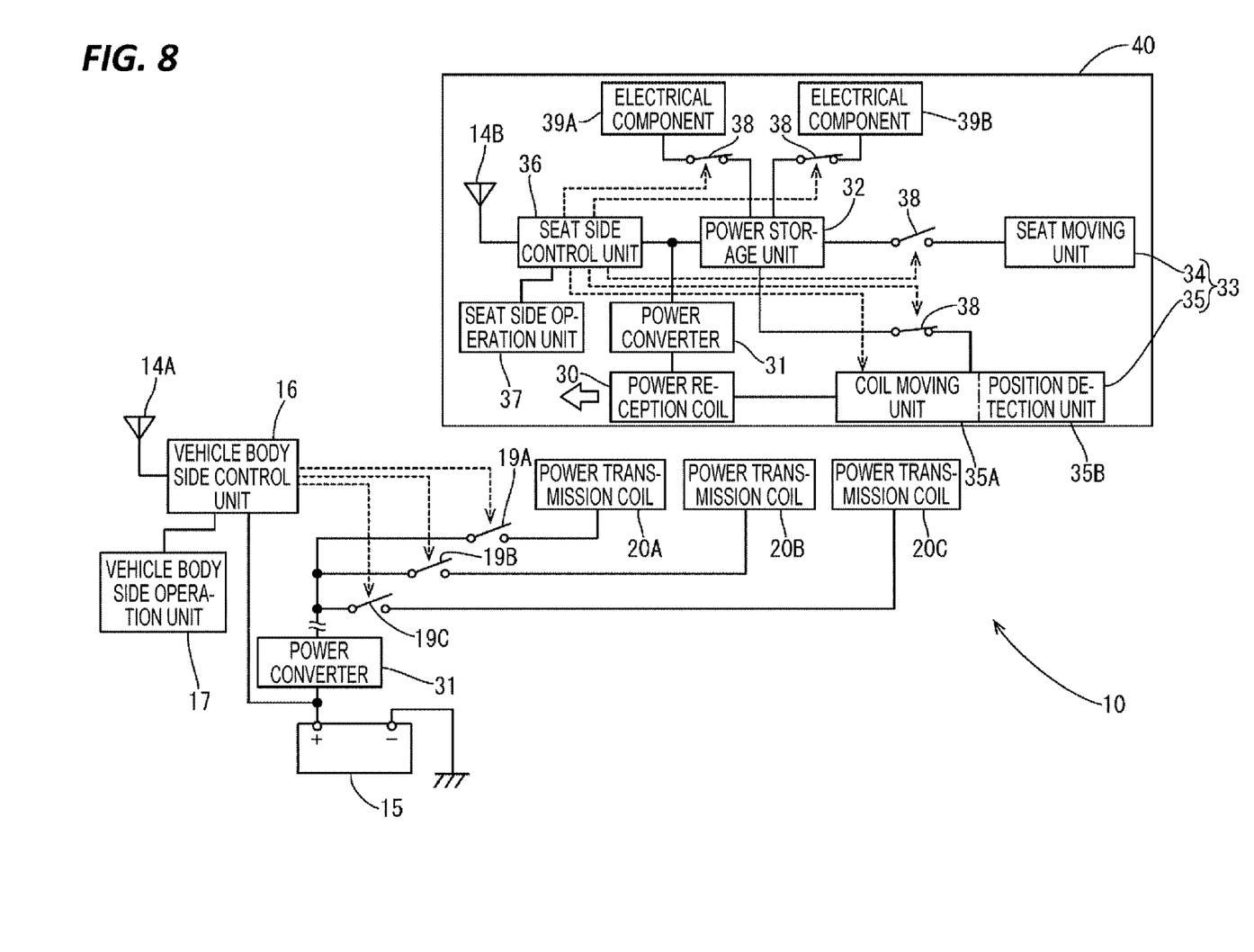
FIG. 8 is a diagram showing a state in which the seat in the state of FIG. 7 has stopped and the power reception coil has started sliding forward.

As shown in FIG. 6, on the vehicle body side, a battery 15, a vehicle body side control unit 16 that is provided in an ECU (Electronic Control Unit) or the like, a vehicle body side operation unit 17 on which a user can operate settings and the like, a plurality of power transmission coils 20A to 20C (Examples of "power transmission units". The power transmission coils 20A to 20C are shown in FIGS. 6 to 8, and other power transmission coils 20D to 20H are omitted.), a power converter 18 that converts the direct current of the battery 15 into an alternating high frequency current and outputs the alternating high frequency current to the plurality of power transmission coils 20A to 20C, and power transmission switches 19A to 19C that are respectively disposed between the power converter 18 and the power transmission coils 20A to 20C are provided. The vehicle body side control unit 16 can transmit and receive signals to and from an antenna unit 14A. The vehicle body side operation unit 17 is capable of performing various operations received from an operation panel or the like outside the seat 40.

(Power Supply System 10)

As shown in FIG. 6, the power supply system 10 includes: the plurality of power transmission coils 20A to 20H; the power reception coil 30 that can receive power from one of the power transmission coils 20A to 20H at a normal position facing the one of the power transmission coils 20A to 20H; a power converter 31 that converts the power received by the power reception coil 30 into a direct current; a power storage unit 32 that stores the power received by the power reception coil 30, and moving means 33 that moves the power reception coil 30 to the normal positions facing the power transmission coils 20A to 20H; a plurality of electrical components 39A and 39B; and a seat side control unit 36 (an example of "control means"). The seat side control unit 36 can transmit and receive signals to and from the antenna unit 14B and a seat side operation unit 37 (an example of "operation means"), and transmits a control signal to power supply switches 38 that turn on/off power supply from the power storage unit 32, and to the moving means 33. As the seat side operation unit 37, for example, a slide switch for sliding the seat 40 through a user operation is provided at an any portion such as an armrest of the seat 40.

The plurality of power transmission coils 20A to 20H are arranged at equal intervals in the front-rear direction. In each of the power transmission coils 20A to 20H, an electric wire is wound in a spiral shape, and the electric wire extends from the outermost circumference of the spiral along the direction in which the power transmission coils 20A to 20H are arranged. As the electric wire, for example, a copper wire that is covered with an insulating layer such as enamel can be used. The power transmission coils 20A to 20H are integrally held by, for example, a synthetic resin, and are fixed to the upper surface of the floor portion 11 through a known fixing means such as screwing or an adhesive. Each of the electric wires is connected to, for example, a device such as an ECU (Electronic Control Unit) via a wire harness that is routed (under a mat, a panel, or the like) on the floor or under the floor of the vehicle body.

In the power reception coil 30, an electric wire is wound in a spiral shape, and the electric wire extends from the outermost circumference of the spiral to the power converter 31 or the like on the seat 40 side. The power reception coil 30 may also be held in a spiral shape by a coil holding portion that is made of a magnetic material such as ferrite, or a synthetic resin, for example. As the electric wire, for example, a copper wire that is covered with an insulating layer such as enamel can be used.

The power storage unit 32 is provided in the seat 40, and can be constituted by, for example, a battery such as a lithium ion secondary battery, a capacitor, or the like. The power storage unit 32 is supplied with power from the power reception coil 30. The power storage unit 32 supplies power to the seat side control unit 36 and the plurality of electrical components 39A and 39B via the power supply switches 38 that can be turned on/off under the control of the seat side control unit 36.

The moving means 33 is provided in the seat 40, and includes a seat moving unit 34 (an example of the "moving means 33") that slides the seat 40, and a position adjusting unit 35 that adjusts the position of the power reception coil 30 with respect to the seat 40. The seat moving unit 34 includes a drive motor that slides the seat 40. The drive motor is connected to the power storage unit 32 via the power supply switch 38, and slides the seat 40 with the power supplied from the power storage unit 32.

The position adjusting unit 35 includes the coil moving unit 35A (an example of the "moving means 33") that moves the power reception coil 30 to the normal positions facing the power transmission coils 20A to 20H, and a position detection unit 35B that detects the position of the power reception coil 30. As the coil moving unit 35A, for example, a ball screw can be used. In this case, the coil moving unit 35A includes the shaft portion 42 (FIG. 3) serving as the screw shaft and a nut (not shown). The screw shaft is rotated by driving the motor that is rotated with the power supplied from the power storage unit 32, and the seat 40 that is fixed to the nut can be slid in the axial direction of the shaft portion 42. Note, that the present invention is not limited to this configuration, and for example, a configuration may also be adopted in which a current flows into a solenoid wound around the shaft portion to move the shaft portion in the axial direction. Also, the coil moving unit 35A (a nut in the case of a ball nut) and the power reception coil 30 can be configured to move together, for example.

The position detection unit 35B includes a sensor or the like, for example. The position detection unit 35B detects, for example, the distances between the axes (the centers of the spirals) of the power transmission coils 20A to 20H and the axis (the center of the spiral) of the power reception coil 30 according to the positions of the power transmission coils 20A to 20H and the power reception coil 30 that are detected by the sensor or the like. Then, the position detection unit 35B outputs, to the coil moving unit 35A, a signal to move the coil moving unit 35A according to the detected distance between the coils. Note, that the position detection unit 35B is not limited to this, and known detection means such as a sensor that can detect the positional relationship between the power transmission coils 20A to 20H and the power reception coil 30 may also be used.

Next, power supply performed by the power supply system 10 will be described with reference to FIGS. 6 to 10.

As shown in FIG. 6, in a state where the power reception coil 30 faces the power transmission coil 20B at the normal position, power is supplied from the vehicle body side to the power storage unit 32 and the like of the seat 40 through the power transmission coil 20B and the power reception coil 30. Here, when the seat side control unit 36 detects that the slide switch (for moving forward) of the seat side operation unit 37 is turned on by the user ("YES" in step 51), the seat side control unit 36 turns on the power supply switch 38 provided for supplying power from the power storage unit 32 to the seat moving unit 34 (step S2). As a result, the seat moving unit 34 is driven by the power supplied from the power storage unit 32, and the seat 40 slides forward. Here, as shown in FIG. 7, when the seat 40 slides, the power reception coil 30 of the seat 40 also slides. Accordingly, the power reception coil 30 moves from the normal position facing the power transmission coil 20B, and power cannot be supplied from the power transmission coil 20B. In this state, the operation of the seat moving unit 34 and the electrical components 39A and 39B is continued with the power supplied from the power storage unit 32. When the user has slid the seat 40 to a desired position (the position in FIG. 7), the user turns off the slide switch of the seat side operation unit 37. When the seat side control unit 36 detects that the slide switch is turned off ("YES" in step S3), as shown in FIG. 8, the seat side control unit 36 turns off the power supply switch 38 that supplies power to the seat moving unit 34 (step S4). As a result, the sliding movement of the seat 40 is stopped.

Figure 9:
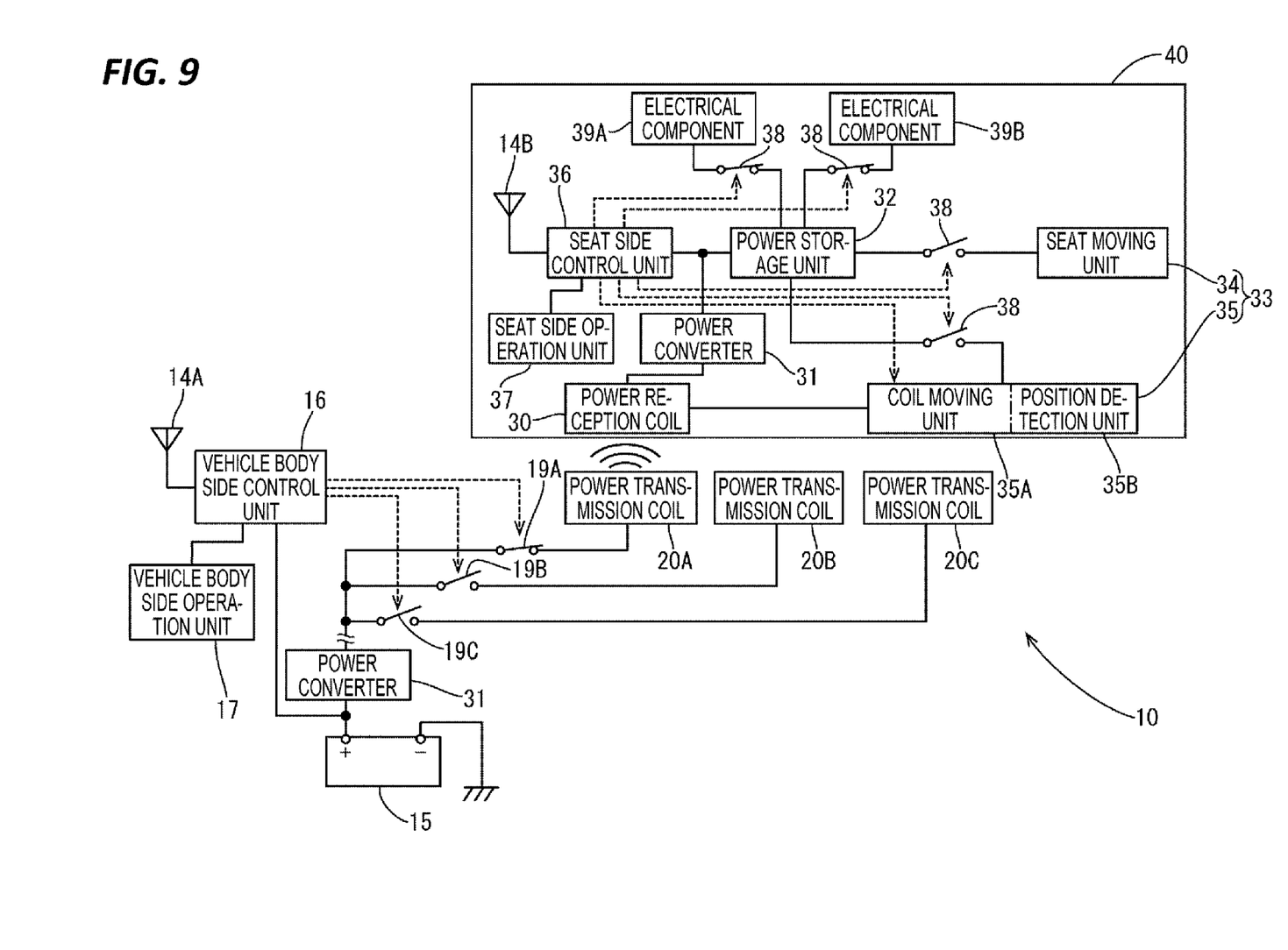
FIG. 9 is a diagram showing a state in which the power reception coil has moved to the normal position from the state of FIG. 8.
Figure 10:
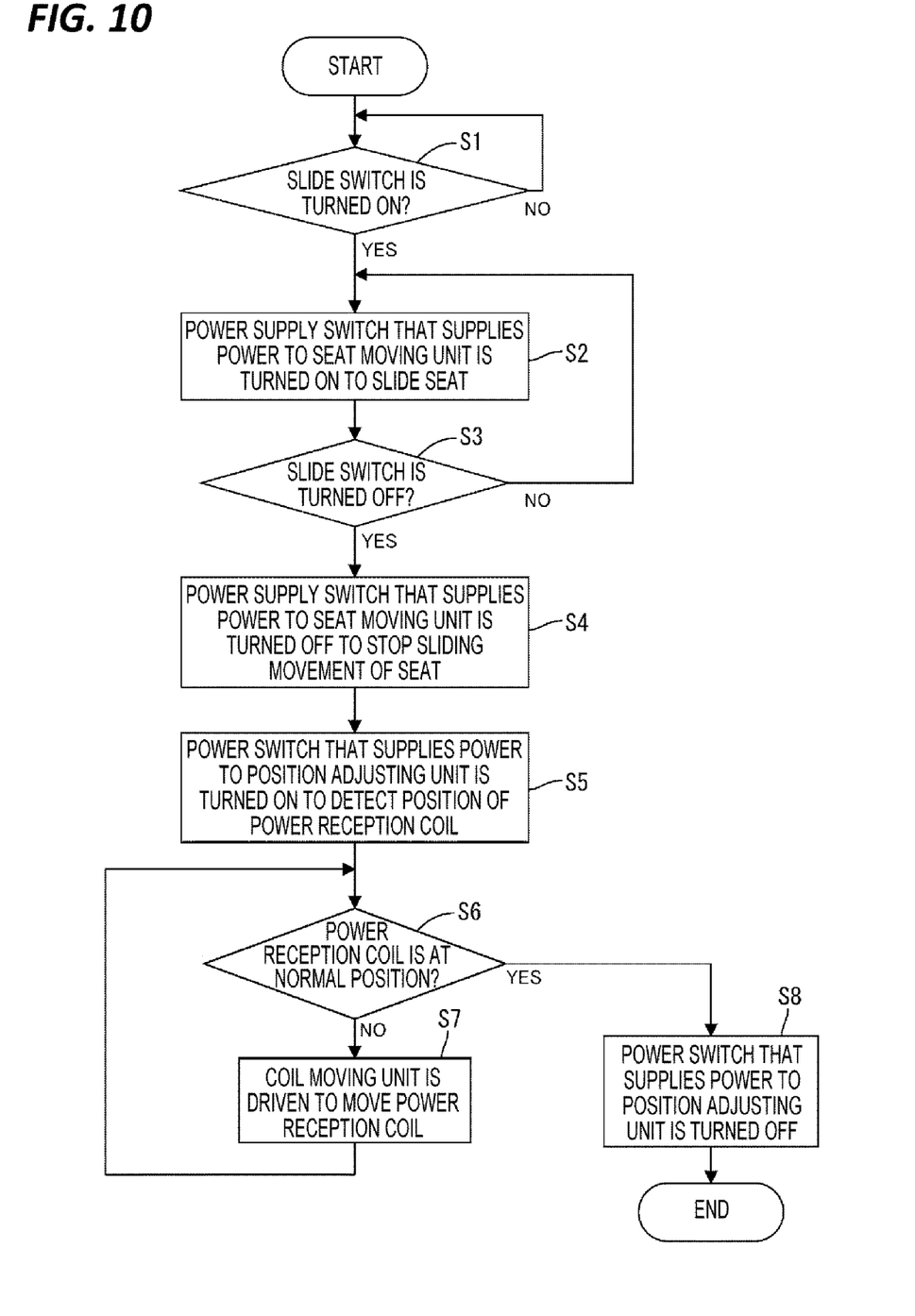
FIG. 10 is a flowchart showing processes of the seat side control unit.

Next, the seat side control unit 36 turns on the power supply switch 38 that supplies power to the position adjusting unit 35 (step S5), and detects the position of the power reception coil 30 through the position detection unit 35B. If, as shown in FIG. 8, the power reception coil 30 is not at the normal position, where power can be supplied, that faces one of the power transmission coils 20A and 20B ("NO" in step S6), the seat side control unit 36 drives the coil moving unit 35A to slide the power reception coil 30 (step S7). When the position detection unit 35B detects that the power reception coil 30 has moved to the normal position ("YES" in step S6) as shown in FIG. 9, the position detection unit 35B turns off the power supply switch 38 that supplies power to the position adjusting unit 35 (step S8) and stops the driving of the coil moving unit 35A. A control signal is output from the seat side control unit 36 to the vehicle body side control unit 16 via antenna units 14A and 14B, the power transmission switch 19B for transmitting power to the power transmission coils 20A to 20H is switched to the power transmission switch 19A by the vehicle body side control unit 16, and the power reception coil 30 can receive power from the power transmission coil 20A that faces the power reception coil 30. Note, that the timing of switching the power transmission switches 19A to 19C is not limited to this. The power transmission switches 19A to 19C may also be switched, for example, when the seat 40 starts to slide or when the seat 40 has moved a predetermined distance.

The operation and effect of the present embodiment will be described next.

The power supply system 10 is for the seat 40 that is slidable with respect to the rails 12 provided on the floor portion 11 of the vehicle body, the power supply system 10 including: the power transmission coils 20A to 20H (the power transmission units) provided on the floor portion 11; the power reception coil 30 (the power reception unit) that is fixed to the seat 40 and that can receive power from the power transmission coils 20A to 20H at normal positions facing the power transmission coils 20A to 20H; and the moving means 33 for moving the power reception coil 30 to a normal position when the power reception coil 30 is not at the normal position.

According to the present embodiment, if the power reception coil 30 is not at a normal position, the power reception coil 30 is moved to the normal position by the moving means 33 to receive power from the power transmission coils 20A to 20H. As a result, deterioration of power supply efficiency can be suppressed. Also, because deterioration of power supply efficiency is suppressed, heat generation of the coils can be suppressed.

The seat 40 includes the power storage unit 32 configured to store power received by the power reception coil 30, and the moving means 33 moves the power reception coil 30 to a normal position with the power supplied from the power storage unit 32.

With this configuration, if power supply from the power transmission coils 20A to 20H to the power reception coil 30 is interrupted when the seat 40 is slid, the power reception coil 30 can be moved to the normal position with the power supplied from the power storage unit 32.

The moving means 33 is the coil moving unit 35A (the power reception moving unit) that moves the power reception coil 30 with respect to the seat 40.

With this configuration, the coil moving unit 35A moves the power reception coil 30 with respect to the seat 40, so that the power reception coil 30 can receive power from the power transmission coils 20A to 20H at the normal positions without further moving the seat 40 that has been slid to a desired position by the user.

The power supply system further includes the seat side operation unit 37 (the operation means) that allows the user to stop the movement of the seat 40, and the seat side control unit 36 (the control means) that controls the coil moving unit 35A to move the power reception coil 30 with respect to the seat 40 when an operation for stopping the movement of the seat 40 is performed by the seat side operation unit 37.

With this configuration, the power reception coil 30 moves when the movement of the seat 40 is stopped. Accordingly, it is possible to easily align the power reception coil 30 with a normal position as compared with a configuration in which the power reception coil 30 is moved when the seat 40 is moved.

The moving means 33 is provided at the seat 40 (i.e. on the seat side).

With this configuration, the available space on the vehicle body side can be increased compared to a configuration in which the moving means 33 is provided on the vehicle body side.

The power supply system 10 includes the plurality of power transmission coils 20A to 20H, and, on the floor portion 11, the plurality of power transmission coils 20A to 20H are disposed side by side along a slide direction of the seat 40.

With this configuration, the plurality of power transmission coils 20A to 20H that supply power to the power reception coil 30 can be switched according to the sliding movement of the seat 40.

Other Embodiments

The technique described in the present specification is not limited to the embodiment described above and illustrated in the drawings. The following embodiments are also included in the technical scope of the technique described in the specification, for example.

(1) In the above embodiment, the power transmission and reception are performed by the power transmission coils and the power reception coil. However, the present invention is not limited to this. Power transmission units and a power reception unit using another known contactless power transmission and reception method such as a capacitor may also be used, for example.

(2) The number of the power transmission coils of 20A to 20H is not limited to the number in the above embodiment, and the number of power transmission coils may also be different from the number in the above embodiment. In addition, one power reception coil is provided in the above embodiment, but the present invention is not limited to this. One power transmission coil may also be provided, and power may also be received by a plurality of power reception coils.

(3) The seat moving unit 34 and the coil moving unit 35A are provided in the seat 40. However, the present invention is not limited to this. At least one of the seat moving unit 34 and the coil moving unit 35A may also be provided on the vehicle body side.

(4) The power storage unit 32 is provided in the seat 40, but the present invention is not limited to this. No power storage unit 32 may also be provided in the seat 40. When the power reception coil 30 is not at a normal position, for example, the power reception coil 30 may also be moved to the normal position by the battery 15 and the moving means provided on the vehicle body side.

(5) The seat 40 slides by operating the slide switch of the seat side operation unit 37, but the present invention is not limited to this. The seat 40 may also be configured to slide through the operation of the slide switch of the vehicle body side operation unit 17, for example. Also, a configuration in which a user manually pushes the seat 40 to slide the seat 40 may also be adopted.

(6) In the present embodiment, the positions where the power transmission coils 20A to 20H and the power reception coil 30 face each other coaxially are the normal positions. However, the present invention is not limited to this. Positions where the axes of the power transmission coils 20A to 20H and the axis of the power reception coil 30 are separated from each other to the extent that power can be supplied may also be set as normal positions.

LIST OF REFERENCE NUMERALS

10 Power supply system
11 Floor portion
12 Rail
20A to 20H Power transmission coil (Power transmission unit)
30 Power reception coil (Power reception unit)
31 Power converter
32 Power storage unit
33 Moving means
34 Seat moving unit
35 Position adjusting unit
35A Coil moving unit (Power reception moving unit)
35B Position detection unit
36 Seat side control unit (Control means)
37 Seat side operation unit (Operation means)
38 Power supply switch
39A, 39B Electrical component
40 Seat

What is claimed is:

1. A power supply system for a seat that is slidable with respect to a rail provided on a bottom of a vehicle body, the power supply system comprising:
   a power transmission coil provided on the bottom of the vehicle body;
   a power reception coil configured to slide with respect to a seat portion of the seat and receive power from the power transmission coil at a normal position facing the power transmission coil; and
   a driving motor configured to move the power reception coil to the normal position, independently of a movement of the seat when the power reception coil is not at the normal position,
   wherein a shaft portion extending in a front-rear direction of the seat is fixed to a bottom surface of the seat, and
   the power reception coil is movable in the front-rear direction of the seat along the shaft portion of the seat by the driving motor.

2. The power supply system according to claim 1,
   wherein the seat includes a battery configured to store power received by the power reception coil, and
   the driving motor is configured to move the power reception coil to the normal position with the power supplied from the battery.

3. The power supply system according to claim 2 further comprising:
   a power supply switch configured to turn on/off power supply from the battery to the driving motor; and
   a controller configured to turn the power supply switch on/off.

4. The power supply system according to claim 3 further comprising:
   a slide switch that is operable by a user to perform the movement of the seat,
   wherein the controller is configured to turn the power supply switch on/off in accordance with an operation of the slide switch.

5. The power supply system according to claim 1, further comprising:
   a position sensor configured to detect a position of the power reception coil,
   wherein the driving motor is configured to move the power reception coil to the normal position based on a detection result provided from the position sensor.

6. The power supply system according to claim 5,
   wherein the driving motor is further configured to move the power reception coil with respect to the seat.

7. The power supply system according to claim 6 further comprising:
   a slide switch that is operable by a user to stop the movement of the seat; and
   a controller configured to control the driving motor to move the power reception coil with respect to the seat when an operation for stopping the movement of the seat is performed by the slide switch.

8. The power supply system according to claim 1,
   wherein the driving motor is provided at the seat.

9. The power supply system according to claim 1, further comprising:
   a plurality of power transmission coils,
   wherein, on the bottom of the vehicle body, the plurality of power transmission coils are disposed side by side along a slide direction of the seat.

* * * * *